United States Patent
Belogolovy

(10) Patent No.: US 10,448,440 B2
(45) Date of Patent: *Oct. 15, 2019

(54) TECHNIQUES FOR WIRELESS COMMUNICATION BETWEEN A TERMINAL COMPUTING DEVICE AND A WEARABLE COMPUTING DEVICE

(71) Applicant: INTEL CORPORATION, Santa Clara, CA (US)

(72) Inventor: Andrey Belogolovy, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/393,317

(22) Filed: Dec. 29, 2016

(65) Prior Publication Data

US 2017/0207825 A1    Jul. 20, 2017

Related U.S. Application Data

(63) Continuation of application No. 14/129,944, filed as application No. PCT/US2013/058186 on Sep. 5, 2013, now Pat. No. 9,538,564.

(51) Int. Cl.
   *H04W 84/12* (2009.01)
   *H04W 76/14* (2018.01)
   *H04W 4/70* (2018.01)
   *G06F 1/16* (2006.01)
   *H04B 5/00* (2006.01)
   (Continued)

(52) U.S. Cl.
   CPC ............ *H04W 76/14* (2018.02); *G06F 1/163* (2013.01); *G06F 1/1635* (2013.01); *H02J 7/025* (2013.01); *H02J 50/10* (2016.02); *H02J 50/20* (2016.02); *H04B 1/385* (2013.01); *H04B 5/0031* (2013.01); *H04B 5/0037* (2013.01); *H04W 4/70* (2018.02); *H04W 8/005* (2013.01); *H04W 8/18* (2013.01); *H04W 12/06* (2013.01); *H04W 24/08* (2013.01);
   (Continued)

(58) Field of Classification Search
   CPC ..... H04W 76/023; H04W 84/12; H04W 8/18; H04B 5/0031
   See application file for complete search history.

(56) References Cited

U.S. PATENT DOCUMENTS 6,593,845 B1    7/2003  Friedman et al.
9,538,564 B2 *  1/2017  Belogolovy .......... H04W 76/14
(Continued)

OTHER PUBLICATIONS

Decision of Grant received for Russian Patent Application No. 2016103876, dated Dec. 19, 2016, 11 pages (untranslated).
(Continued)

*Primary Examiner* — Wei Zhao

(57) ABSTRACT

Examples are disclosed for wireless communication between a terminal computing device and a wearable computing device. In some examples, wireless local area network (WLAN) transmissions for packets of various sizes may be transmitted from a terminal computing device to a wearable computing device. At least some of the WLAN transmissions may be used by the terminal computing device to communicate to the wearable computing device based on the wearable computing device having an ability to detect the variable packet sizes. Other examples are described and claimed.

30 Claims, 11 Drawing Sheets

(51) Int. Cl.
  *H04W 8/18*    (2009.01)
  *H04W 12/06*   (2009.01)
  *H02J 50/20*   (2016.01)
  *H02J 50/10*   (2016.01)
  *H04W 76/11*   (2018.01)
  *H02J 7/02*    (2016.01)
  *H04B 1/3827*  (2015.01)
  *H04W 8/00*    (2009.01)
  *H04W 24/08*   (2009.01)
  *H02J 7/00*    (2006.01)

(52) U.S. Cl.
  CPC ............ *H04W 76/11* (2018.02); *H04W 84/12* (2013.01); *H02J 2007/0001* (2013.01)

(56) References Cited

U.S. PATENT DOCUMENTS

| | | |
|---|---|---|
| 2007/0109121 A1 | 5/2007 | Cohen |
| 2007/0132587 A1 | 6/2007 | Smith et al. |
| 2007/0230493 A1 | 10/2007 | Dravida et al. |
| 2007/0242688 A1 | 10/2007 | McFarland |
| 2010/0110913 A1* | 5/2010 | Min ............... H04B 17/345 370/252 |
| 2010/0314452 A1 | 12/2010 | Yeo et al. |
| 2011/0244800 A1* | 10/2011 | Bogestam ............ G06Q 30/02 455/41.2 |
| 2011/0260839 A1 | 10/2011 | Cook et al. |
| 2015/0127628 A1* | 5/2015 | Rathod ............... H04W 4/21 707/710 |

OTHER PUBLICATIONS

European Search Report and Written Opinion for the European Patent Application No. 13892963, dated Mar. 10, 2017, 9 pages.

Ye Chen et al., "An RTS-on-demand Mechanism to Overcome Self-interference in an 802.11 System", Military Communications Conference, 2007. Milcom 2007. IEEE, IEEE, Piscataway, NJ, USA, Oct. 29, 2007, pp. 1-7, KP031232960, ISBN: 978-1-4244-1512-0.

* cited by examiner

1000

TRANSMIT A PACKET HAVING A FIRST PACKET SIZE VIA A WLAN TRANSMISSION, THE WLAN TRANSMISSION CAPABLE OF BEING HARVESTED FOR ENERGY BY ONE OR MORE WEARABLE COMPUTING DEVICES
1002

TRANSMIT AN IDENTIFICATION MESSAGE INCLUDING AN IDENTIFIER FOR A WEARABLE COMPUTING DEVICE FROM AMONG THE ONE OR MORE WEARABLE COMPUTING DEVICES, THE IDENTIFICATION MESSAGE TRANSMITTED BASED ON MULTIPLE WLAN TRANSMISSIONS HAVING A FIRST COMBINATION OF SECOND AND THIRD PACKET SIZES TO INDICATE THE IDENTIFIER
1004

TRANSMIT A COMMAND MESSAGE INCLUDING A COMMAND TO THE WEARABLE COMPUTING DEVICE, THE COMMAND MESSAGE TRANSMITTED BASED ON MULTIPLE WLAN TRANSMISSIONS HAVING A SECOND COMBINATION OF THE SECOND AND THE THIRD PACKET SIZES
1006

TRANSMIT A SECOND PACKET HAVING THE FIRST PACKET SIZE VIA A SECOND WLAN TRANSMISSION
1008

TRANSMIT A SECOND IDENTIFICATION MESSAGE THAT INCLUDES THE IDENTIFIER, THE WEARABLE COMPUTING DEVICE CAPABLE OF HARVESTING ENERGY FROM THE SECOND WLAN TRANSMISSION AND USE THE HARVESTED ENERGY TO TRANSMIT THE RESPONSE TO THE COMMAND MESSAGE RESPONSIVE TO RECEIVING THE SECOND PACKET AND THE SECOND IDENTIFICATION MESSAGE
1010

RECEIVE A RESPONSE TO THE COMMAND FROM THE WEARABLE COMPUTING DEVICE
1012

*FIG. 10*

Storage Medium *1100*

Computer Executable Instructions for 1000

*FIG. 11*

TECHNIQUES FOR WIRELESS COMMUNICATION BETWEEN A TERMINAL COMPUTING DEVICE AND A WEARABLE COMPUTING DEVICE

CROSS-REFERENCE TO RELATED APPLICATIONS

This application is a continuation of, claims the benefit of, and claims priority to U.S. patent application Ser. No. 14/129,944, filed Dec. 28, 2013, which in turn is a U.S. national phase application of international patent application number PCT/US2013/058186 filed Sep. 5, 2013. The subject matter of said U.S. patent application and international patent application are incorporated herein by reference in their entireties.

TECHNICAL FIELD

Examples described herein are generally related to wireless communication with a wearable computing device.

BACKGROUND

Wearable computing devices are typically small computing devices operating on relatively small amounts of power. Wearable computing devices may gather information such as sensor information, perform minor processing functions and then convey information to a terminal computing device. The terminal computing device may be a larger device such as a notebook computer, a tablet computer or a smart phone. The small size of wearable computing devices may result in use of these types of devices for monitoring or sensing biological and/or environmental conditions on, in or around a person, animal or inanimate object. A wearable computing device may communicate with a terminal computing device using low power wireless communications.

BRIEF DESCRIPTION OF THE DRAWINGS

FIG. 10 illustrates an example of a second logic flow.
FIG. 11 illustrates an example of a second storage medium.

DETAILED DESCRIPTION

Figure 1:
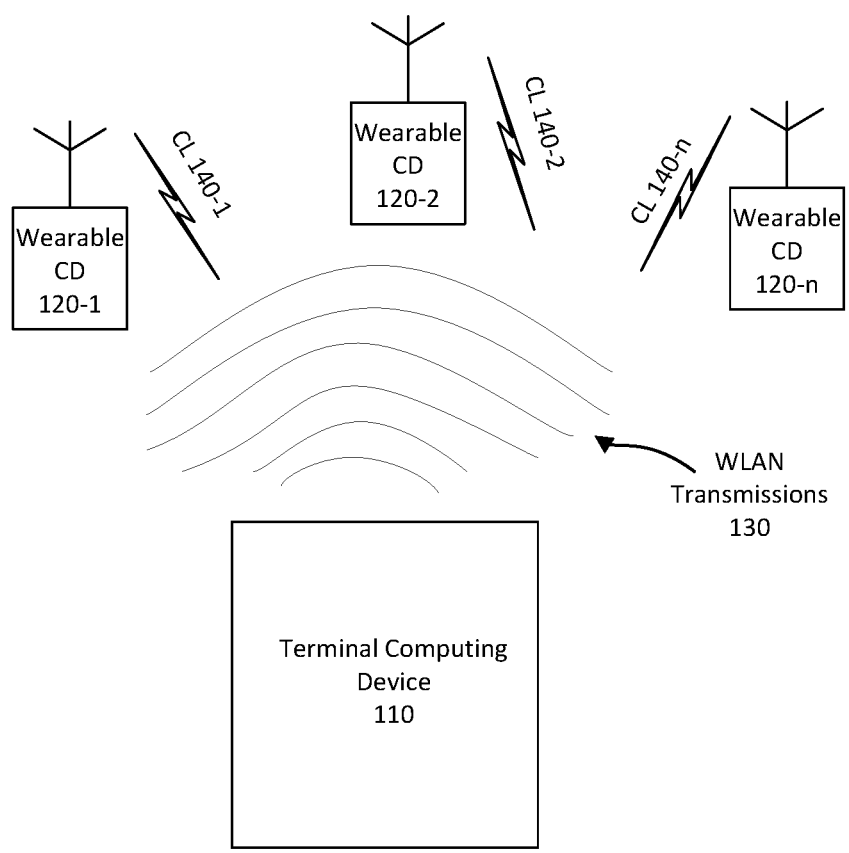
FIG. 1 illustrates an example of a first system.

Examples are generally directed to improvements for wireless communication between a terminal computing device and a wearable computing device. A wearable computing device may communicate via wireless communications due to a desire for flexibility in deploying these types of devices on the surface or within a person, animal or inanimate object. As such wearable computing devices may be small (e.g., a few millimeters in diameter) and may use low amounts of power to both gather sensor information and for wireless communication to a terminal computing device. The wireless communication may be to transmit sensor information, transmit operating status information or to receive commands. The small size of wearable computing devices may be problematic to the use of batteries to power operations and/or for use in wireless communication.

In some examples, wearable computing devices may be powered by a specialized external source based on near field communications (NFC). The specialized external source may provide an electromagnetic field that may be harvested by circuitry at the wearable computing device. A possible problem with NFC is that the proximity needed to power the wearable computing device with specialized external sources may be only a few centimeters. Also, many types of terminal computing devices lack NFC capabilities. However, another source of electromagnetic field associated with wireless local area network (WLAN) transmissions that uses far field radio communications has a far greater range to power a wearable computing device and are common used for wireless communications with most types of terminal computing devices. For example, the WLAN transmissions may be used in accordance with one or more WLAN standards based on carrier sense multiple access with collision detection (CSMA/CD) such as those promulgated by the Institute of Electrical Engineers (IEEE). These WLAN standards may be based on CSMA/CD wireless technologies such as Wi-Fi™ and may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

In some examples, Wi-Fi wireless technologies commonly in use by most terminal computing devices may provide an acceptable electromagnetic field for energy harvesting via WLAN transmissions. These WLAN transmissions may be harvested by circuitry at the wearable computing device at distances of at least one meter. However, the amount of energy harvested still may not be enough for a wearable computing device to receive information, decode that information, encode a response and then transmit the response using similar Wi-Fi wireless or other types of CSMA/CD technologies. It is with respect to these and other challenges that the examples described herein are needed.

According to some examples, example first methods may be implemented at a wearable computing device. For these example first methods, WLAN transmission from a terminal computing device may be detected. The WLAN transmission may be for a packet having a first packet size. The wearable computing device may then receive an identification message from the terminal computing device if the first packet size exceeds a threshold size. A determination may then be made as to whether the identification message includes an identifier that matches an assigned identifier for the wearable computing device. The wearable computing device may either reset to an idle mode if no match or receive a command message from the terminal computing device if a match was determined. A response message may then be transmitted to the terminal computing device in response to the received command message. In some examples, detected WLAN transmissions for packets of variable sizes may be used as a part of a modulation scheme for a terminal computing device to communicate with the wearable computing device. At least some of the detected WLAN transmissions may be harvested for energy by the wearable computing device and the harvested energy used to transmit a response to the terminal computing device.

In some examples, example second methods may be implemented at a terminal computing device. For these example second methods, a packet having a first packet size may be transmitted via a WLAN transmission to one or more wearable computing devices. The WLAN transmission may be capable of being harvested for energy by the one or more wearable computing devices. An identification message may then be transmitted that includes an identifier for a wearable computing device from among the one or more wearable computing devices. The identification message may be transmitted based on multiple WLAN transmissions having a first combination of second and third packet sizes to indicate the identifier. A command message may then be transmitted that includes a command to the wearable computing device. The command message may be transmitted based on multiple WLAN transmissions having a second combination of the second and the third packet sizes. A response to the command from the wearable computing device may then be received. As mentioned above for the example first methods, in some examples, the wearable computing device may harvest energy from at least some of the WLAN transmissions and use the harvested energy to transmit the response.

FIG. 1 illustrates an example first system. In some examples, the example first system includes system 100. System 100, as shown in FIG. 1, includes a terminal computing device 110 and wearable computing devices (CD) 120-1 to 120-n, where "n" represents any positive whole integer greater than 2. According to some examples, terminal computing device 110 may include, but is not limited to, a notebook, a tablet or a smart phone that may be carried or placed at a distance of approximately one meter from where wearable CDs 120-1 to 120-n are located. As described more below, wearable CDs 120-1 to 120-n may be a small form factor that may be small enough to be located on the surface (e.g., on an outer layer) or within (e.g., ingested) a person, an animal or an inanimate object. Wearable CDs 120-1 to 120-n may also be so small that batteries to fit within these types of small form factors may not provide adequate power.

In some examples, terminal computing device 110 may include logic and/or features capable of generating wireless local access network (WLAN) transmissions 130 (e.g., using Wi-Fi wireless technologies). The logic and/or features at terminal computing device 110 may also be capable of generating messages and transmitting those messages via WLAN transmissions 130 in a manner that includes packets of various sizes. As described more below, a modulation scheme may be used that is based on variable packet sizes and the amount of charge time a wearable computing device may harvest energy from separate WLAN transmissions such as WLAN transmissions 130 that may have been used to transmit each packet of a given size.

According to some examples, using at least some of WLAN transmissions 130, a targeted wearable CD from among wearable CDs 120-1 to 120-n may harvest energy and transmit a response via communication links (CLs) 140-1, 140-2 and 140-n, respectively. For these examples, the response may be transmitted based on a re-radiation principle via use of non-linear scattering effect. The non-linear scattering effect may be associated with WLAN transmissions 130 made in accordance with Wi-Fi wireless technologies such as those described by one or more IEEE 802.11 standards or other types of CSMA/CD related standards. In some examples, non-linear scatter may be loaded on a nonlinear element (not shown) at wearable CDs 120-1 to 120-n, which can be either plugged or unplugged by means of detecting WLAN transmissions 130. When the non-linear element is plugged, side harmonics of received signals propagated by WLAN transmissions 130 appear in current going through an antenna load. These side harmonics are reradiated with the same antenna. For these examples, just a second tone may be used and others may be rejected via a filter. Thus plugging or unplugging the non-linear elements according to received signals via WLAN transmissions 130 may allow for various modulation schemes. For example, on/off keying, pulse position modulation (PPM) are examples of some of the various modulation schemes that may be used by wearable CDs 120-1 to 120-n to transmit a response to terminal computing device 100 via respective CLs 140-1 to 140-n.

Figure 2:
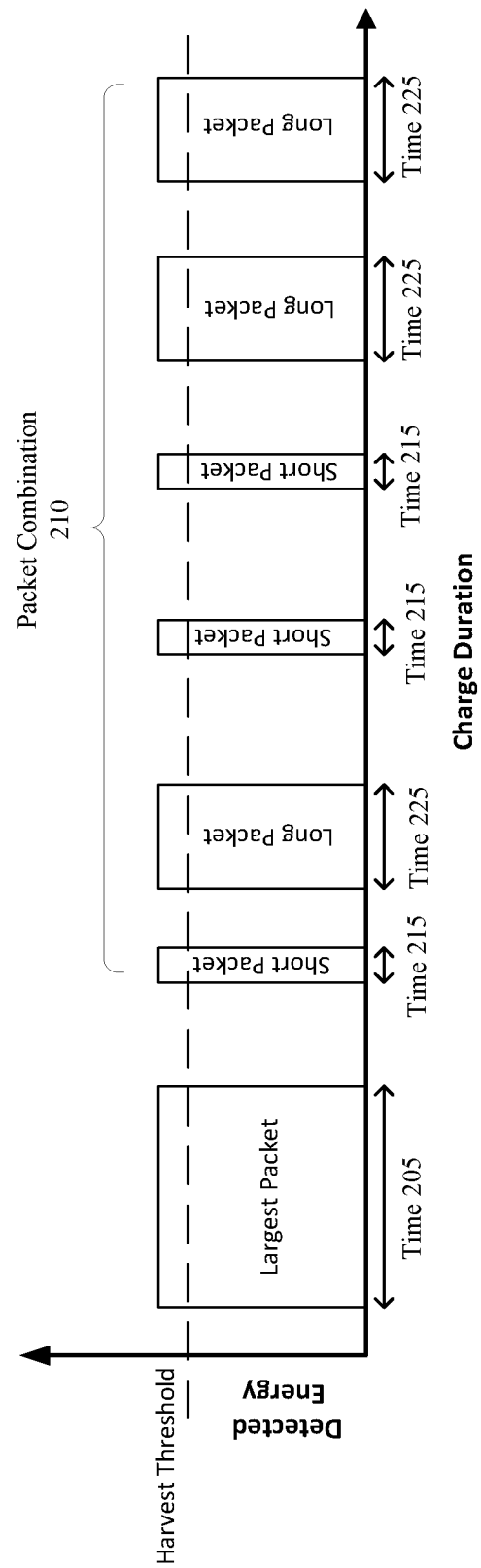
FIG. 2 illustrates an example modulation scheme.

FIG. 2 illustrates an example modulation scheme 200. In some examples, as shown in FIG. 2, modulation scheme 200 includes packets of various packet sizes each having a charge duration of a given time when WLAN transmissions used to transmit the packets are harvested by a wearable computing device. For example, three different packet sizes are shown in FIG. 2 as largest packet, short packet and long packet having respective charge times identified as time 205, time 215 and time 225. According to some examples, the charge duration time may not be started until detected energy for a given WLAN transmission to transmit a packet reaches a harvest threshold at the wearable computing device. An example harvest threshold is shown by the dashed-line in FIG. 2.

According to some examples, largest packet having a time 205 may be used in one or more messages by a terminal computing device to indicate to a wearable computing device that either a command is forthcoming or to transmit data/response to a previous request. Meanwhile, combinations of short and long packets having times of 215 and 225 may be used in identification messages by the terminal computing device to indicate which wearable computing device is to respond to the command message and/or a transmit message. Combinations of short and long packets having times 215 and 225 may also be used in command messages to the identified wearable computing device to indicate a command.

In some examples, the use of combinations of short and long packets may include assigning a bit value of either a "1" or "0" to each short or long packet. For example, a "0" may be assigned to a short packet having time 215 and a "1" may be assigned to a long packet having time 225. Using these example assigned bit values, packet combination 210 as shown in FIG. 2 may indicate a 6-bit value of 010011. The 6-bit value, for example, may be an identifier to indicate a given wearable computing device via which a terminal computing device may be targeting for a communication. Logic and/or features at a terminal computing device may be capable of using packet combinations having two packet sizes to generate any number of bits to encode or decode messages generated in a manner similar to modulation scheme 200. Also, logic and/or features at a wearable computing device may be capable of decoding theses message.

According to some examples, the largest packet having time 205 may be the largest packet size allowed by one or more IEEE 802.11 standards or other types of CSMA/CD standards being used for the WLAN transmission to transmit packets. For example, some IEEE 802.11 standards allow for a maximum or largest packet size of 2132 bytes. Also, the short packet having time 215 may represent a packet that includes just a preamble and a header and may represent the smallest packet used for WLAN transmissions to transmit packets. Long packet having time 225 may represent a packet that is substantially larger than the short packet but also substantial smaller than the largest packet size. For example, the long packet may have a packet size of 500 bytes. Examples are not limited to the above-mentioned packet sizes provided for the largest, long and short packets. Also, largest packet sizes may be dictated by other standards than IEEE 802.11 for WLAN transmissions.

In some examples, a terminal computing device configured to implement a modulation scheme similar to modulation scheme 200 may include a media access controller (MAC) as part of a wireless network controller that may operate in accordance with Wi-Fi wireless technologies such as IEEE 802.11 standards. For these examples, use of variable packet sizes to transmit messages to a wearable computing device requires little to no modification to modulation coding schemes used by a Wi-Fi MAC operating in compliance with IEEE 802.11 standards. In order to implement the modulation scheme that is similar to modulation scheme 200, logic and/or features of the terminal computing device may be capable of causing three distinct packet sizes or lengths that may be formatted by the MAC in accordance with IEEE 802.11 standards and then transmitted using WLAN transmissions.

Figure 3:
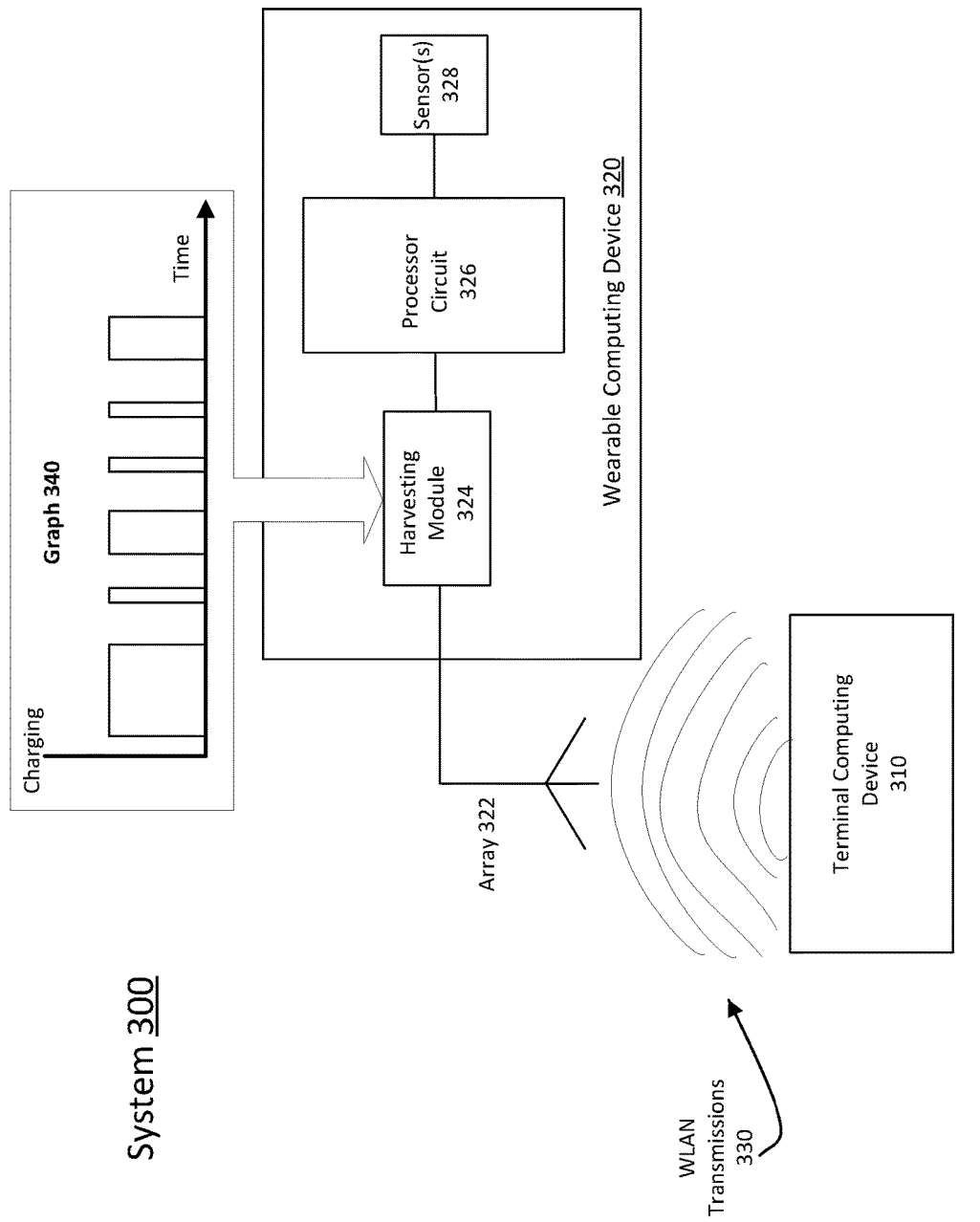
FIG. 3 illustrates an example of a second system.

FIG. 3 illustrates an example second system. In some examples, the example second system includes system 300. System 300 as shown in FIG. 3 includes a terminal computing device 310 and a wearable computing device 320. Similar to system 100's terminal computing device 110 shown in FIG. 1, terminal computing device 310 is shown in FIG. 3 as transmitting WLAN transmissions 330.

According to some examples, an array 322 of wearable computing device 320 may include one or more antennae to enable at least some of the energy from WLAN transmissions 130 to be routed to a harvesting module 324. As described more below, logic and/or features included in processor circuit 326 may be capable of using a modulation scheme similar to modulation scheme 200 to receive and decode messages from terminal computing device 310 based on charge times associated with variable packet sizes transmitted using WLAN transmissions 330. Also, in some examples, data or information gathered from sensor(s) 328 may be communicated back to terminal computing device 310 in response to at least some of the received messages.

In some examples, as shown in FIG. 3, graph 340 depicts example charging times for variable sized packets that may have been transmitted via WLAN transmissions 330. For these examples, harvesting module 324 may include circuitry (e.g., one or more capacitors, rectifiers, voltage monitors, etc.) to enable the harvesting of energy from WLAN transmissions 330. The harvesting of energy may be possible due to both a close proximity (e.g., within 1 meter) of terminal computing device 310 to wearable computing device 320 and due to energy typically associated with a WLAN transmission associated with Wi-Fi wireless technologies such as described by IEEE 802.11 or other types of CSMA/CD standards. A Wi-Fi WLAN transmission used to transmit a packet may have a power as high as 20 dBm, where "dBm" is a power ratio in decibels of measured power referenced to one milliwatt. In some cases a terminal computing device may use lower power levels of around 5 dBm for WLAN transmissions. Even at power levels of around 5 dBm, 1 microwatt (1 µW) of energy may be still be available for harvesting at a distance of 1 meter.

According to some examples, 1 µW may establish a harvest threshold via which logic and/or features of processor circuit 326 may start to track/time charging and associate that time with a packet of a given size. For example, the dashed-line shown in FIG. 2 may correspond to a harvest threshold of 1 µW of power available for harvesting. Once harvesting is started, the start of a transmission of a given packet may be detected. Also, once the power drops below 1 µW the end of the transmission of the packet may be detected. The logic and/or features of processor circuit 326 may then use the time of the transmission that corresponds to the charge time to determine the size of the packet. According to some examples, either the size of a single packet or combinations of two packet sizes may be used by logic and/or features at terminal computing device 310 and processor circuit 326 to send or receive various types of messages as discussed in more details below.

In some examples, as shown in FIG. 3, wearable computing device 320 also includes sensor(s) 328. Sensor(s) 328 may include one or more sensors to measure sensor information and may couple to processor circuit 326 and provide the measured sensor information to logic and/or features at processor circuit 326. Although shown in FIG. 3 as being resident on wearable computing device 320, in some other examples, at least some sensor(s) 328 may be located outside of wearable computing device 320. For these other examples, sensor(s) 328 located outside of wearable computing device 320 may couple with processor circuit 326 via one or more communication links (e.g., a wired communication link). Sensors(s) 328 may include, but are not limited to a temperature sensor, a blood pressure sensor, an oxygen sensor, a heart rate sensor, a moisture sensor, an accelerometer sensor, a position sensor or a location sensor such as a global positioning system (GPS) sensor.

Figure 4:
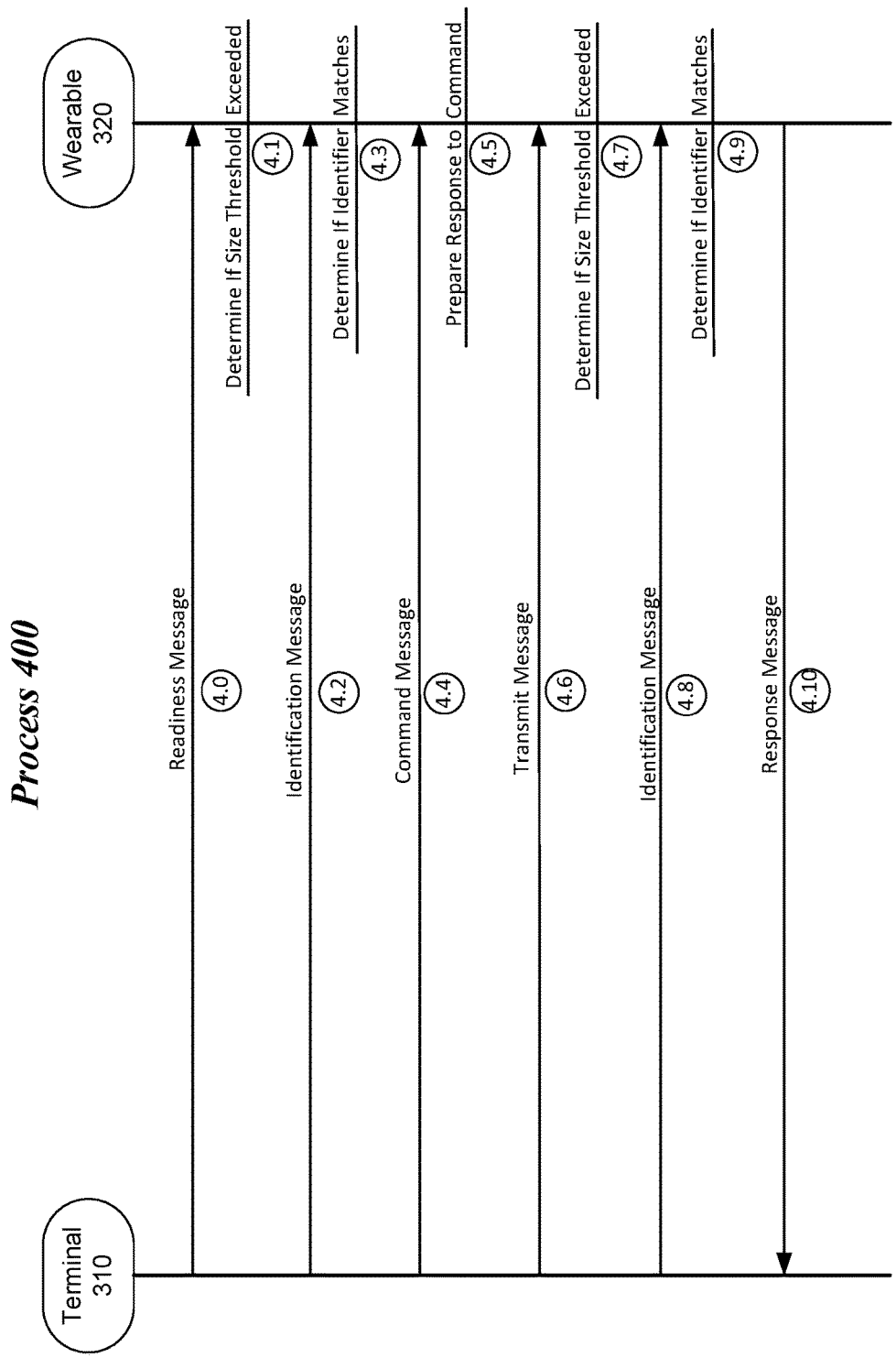
FIG. 4 illustrates an example of a process.

FIG. 4 illustrates an example process 400. In some examples, process 400 may be for wireless communication between terminal computing device 310 shown in FIG. 4 as terminal 310 and wearable computing device 320 shown as wearable 320. For these examples, elements of systems 300 as shown in FIG. 3 may be used to illustrate example operations related to process 400. However, the example operations are not limited to implementations using elements of system 300.

Beginning at process 4.0 (Readiness Message), logic and/or features at terminal 310 may generate a readiness message having a first packet size and cause a packet having the first packet size to be transmitted to wearable 320 via a WLAN transmission. For example, the first packet size may be the largest packet size allowed for transmitting packets via WLAN transmissions done in accordance with one or more CSMA/CD related standards such as IEEE 802.11.

Proceeding to process 4.1 (Determine If Size Threshold Exceeded), logic and/or features at wearable 320 may determine if the packet of the first size that was sent by terminal 310 as the readiness message exceeds a size threshold. The size, for example, may be based on the charge time associated with harvesting energy from the WLAN transmission used to transmit the packet. In some examples, the size threshold may be based on a size that is as large as the largest packet size allowed or at least somewhat larger than other packet sizes used for other types of messages. For example, if a modulation scheme similar to modulation scheme 200 shown in FIG. 2 is used, the threshold would be somewhat larger than the size of the long packets. Being somewhat larger than the size of the long packets may be an indication to the logic and/or features at wearable 320 that the packet is not part of a combination of packets but rather indicates that subsequent messages are coming and to be ready to receive those subsequent messages that may include combinations of packet sizes.

Proceeding to process 4.2 (Identification Message), logic and/or features at terminal 310 may generate an identification message including an identifier assigned to wearable 320. According to some examples, the identifier included in the identification message may be based on multiple WLAN transmissions having a first combination of second and third packet sizes. In some examples, the second packet size may be similar to the short packets and the third packet size similar to the long packets described above for FIG. 2. For these examples, each short packet in the first combination may represent a "0" bit value and each long packet may represent a "1" bit value. Thus, the first combination including short and long packets may be used to create a multi-bit value that may represent an assigned identifier for wearable 320.

Proceeding to process 4.3 (Determine If Identifier Matches), logic and/or features at wearable 320 may determine whether the identifier included in the identification message sent from terminal 310 matches wearable 320's identifier. In some examples, the logic and/or features of wearable 320 may decode (e.g., using modulation scheme 200) the first combination of second and third packet sizes based on associated charge times for multiple WLAN transmissions used to transmit the identification message. For these examples, the logic and/or features of wearable 320 may maintain an assigned identifier in a data structure such as lookup table (LUT) and may compare that assigned identifier with the multi-bit value decoded from the first combination. If a match is found, wearable 320 may then prepare to receive a command message from terminal 310.

According to some examples, if a match is not found wearable 320 may reset to an idle state. Resetting to an idle state may include resetting charge duration timers and/or ignoring or not receiving one or more subsequent, detected WLAN transmissions for packets having a packet size below the threshold size. In other words, unless a packet of the first packet size is detected; wearable 320 may take no further actions to prepare a response or communicate with terminal 310. Wearable 320 may merely harvest energy from subsequent WLAN transmission for packets having packet sizes below the threshold size.

Proceeding to process 4.4 (Command Message), logic and/or features at terminal 310 may generate a command message including a command for wearable 320. In some examples, the command may be based on multiple WLAN transmissions having a second combination of the second and third packet sizes. As mentioned above for process 4.2, in some examples, the second combination of the second and third packet sizes may create a multi-bit value that may be associated with one or more commands. These commands may include, but are not limited to, a status update request from wearable 320, a sensor data request for sensor(s) with or coupled to wearable 320 or a reset command for wearable 320 or one or more sensors coupled to wearable 320.

Proceeding to process 4.5 (Prepare Response to Command), logic and/or features at wearable 320 may prepare a response to the command included in the received command message. According to some examples, if the command was a status request, information to report the status request may be gathered. If the command was a data request for sensor(s), data may be gathered from the sensor(s) and prepared for reporting to terminal 310. If the command was for a reset, wearable 320 may reset and then prepare a response to indicate that the reset was completed.

Proceeding to process 4.6 (Transmit Message), logic and/or features at terminal 310 may generate a transmit message having the first packet size (e.g., largest packet size). In some examples, the transmit message may be transmitted via a WLAN transmission capable of being harvested for energy by wearable 320. The transmit message may serve two purposes. First, to provide harvestable power so that wearable 320 can transmit a response. Second, to provide an indication to prepare to send the response if a subsequent identification message as described more below is received that has a matching identifier.

Proceeding to process 4.7 (Determine If Size Threshold Exceeded), logic and/or features at wearable 320 may determine if the packet of the first packet size used to transmitted via the WLAN transmission exceeds the size threshold. The same process as described above for process 4.1 may be used to make this determination.

Proceeding to process 4.8 (Identification Message), logic and/or features at terminal 310 may generate another or second identification message including the identifier assigned to wearable 320. According to some examples, identification message may be generated as mentioned in process 4.2.

Proceeding to process 4.9 (Determine If Identifier Matches), logic and/or features at wearable 320 may determine whether the identifier included in the second identification message sent from terminal 310 matches wearable 320's identifier. In some examples, this check for a match may prevent wearable 320 from sending information that may have been destined for another wearable device. A similar matching process as mentioned above for process 4.3 may be followed. However, different than for process 4.1, wearable 320 does not reset to an idle state if the identifier does not match. Rather, wearable 320 may continue to wait for an identification message including a matching identifier.

Proceeding to process 4.10, (Response Message), logic and/or features at wearable 320 may use at least some of the energy harvested from the WLAN transmissions that were used to send the transmit and/or the identification messages to wearable 320 for sending a response message to terminal 310. According to some examples, the response message may include, but is not limited to, a status indication for wearable 320, an indication of completion of a command or data associated with a sensor located at or coupled with wearable 320.

According to some examples, once the response message is sent, wearable 320 may reset back to an idle state and the process may start over at process 4.0 upon receipt of another readiness message from terminal 310.

Figure 5:
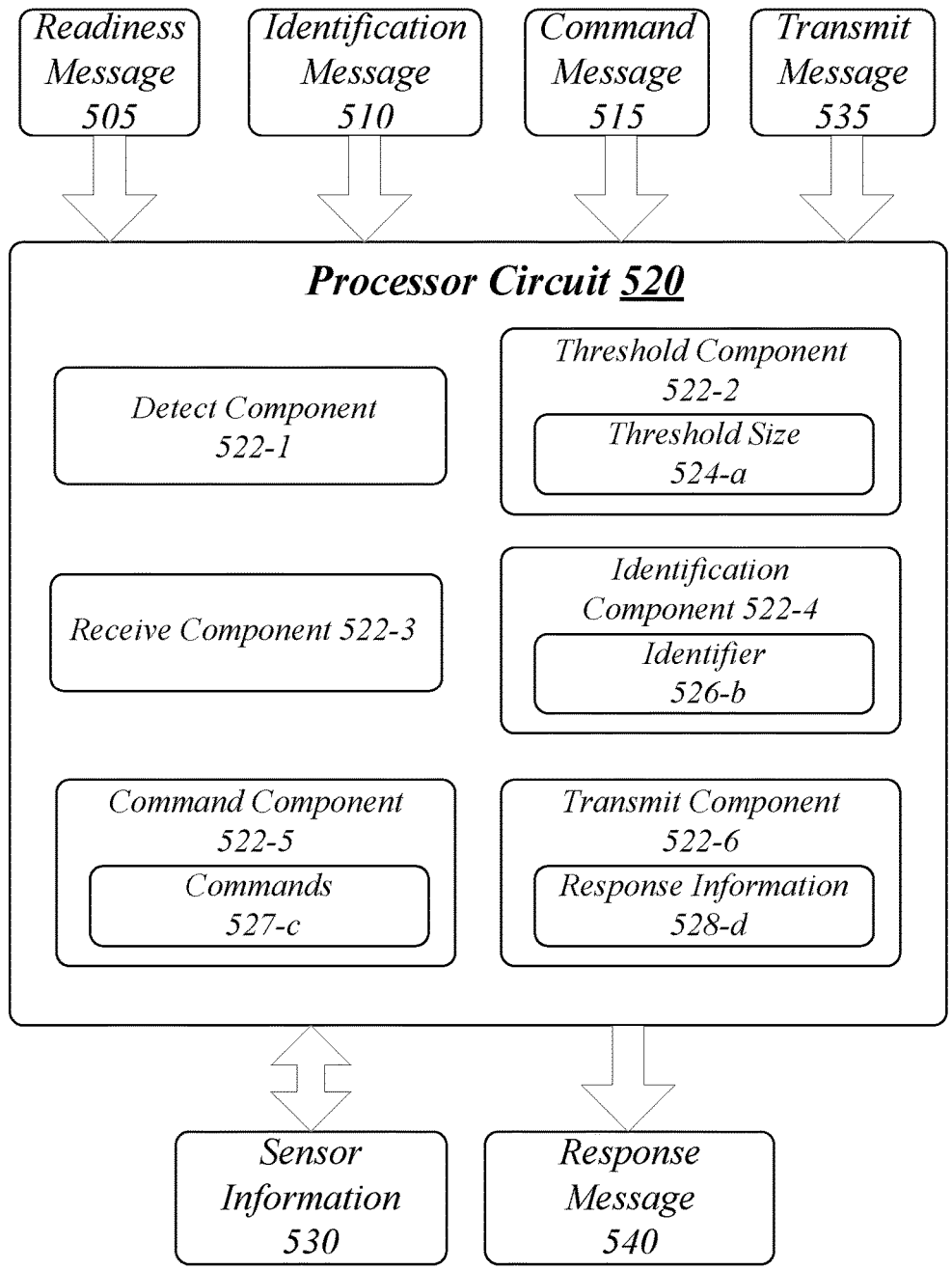
FIG. 5 illustrates an example block diagram for a first apparatus.

FIG. 5 illustrates a block diagram for a first apparatus. As shown in FIG. 5, the first apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may include a computing device and/or firmware implemented apparatus 500 having processor circuit 520 arranged to execute one or more components 522-$a$. It is worthy to note that "a" and "b" and "c" and similar designators as used herein are intended to be variables representing any positive integer. Thus, for example, if an implementation sets a value for a=6, then a complete set of components 522-$a$ may include components 522-1, 522-2, 522-3, 522-4, 522-5 or 522-6. The examples are not limited in this context.

According to some examples, apparatus 500 may be part of a wearable computing device arranged to wirelessly communicate with a terminal computing device. The examples are not limited in this context.

In some examples, as shown in FIG. 5, apparatus 500 includes processor circuit 520. Processor circuit 520 may be generally arranged to execute one or more components 522-a. Processor circuit 520 can be any of various commercially available processors, such as embedded and secure processors, dual microprocessors, multi-core processors or other multi-processor architectures. According to some examples, processor circuit 520 may also be an application specific integrated circuit (ASIC) and at least some components 522-a may be implemented as hardware elements of the ASIC.

According to some examples, apparatus 500 may include a detect component 522-1. Detect component 522-1 may be executed by processor circuit 520 to detect a WLAN transmission from a terminal computing device of a packet having a first size. The detection may be based on whether a harvesting module on the wearable computing device including apparatus 500 is capable of harvesting energy from the WLAN transmission throughout the transmission of the packet having the first packet size. For example, readiness message 505 may include a packet having a first size that equates to the largest size allowed when the WLAN transmission was made in accordance with one or more IEEE 802.11 standards or other types of CSMA/CD standards. If the harvest module is capable of harvesting energy (e.g., above the harvest threshold) throughout the transmission of readiness message 505 then the packet having the first size may be detected.

In some examples, apparatus 500 may also include a threshold component 522-2. Threshold component 522-2 may be executed by processor circuit 520 to determine whether the first packet size exceeds a threshold size. For example, threshold component 522-2 may determine whether the first packet size in readiness message 505 exceeds the threshold size. The threshold size may be maintained by threshold component 522-2 in a data structure such as a lookup table (LUT) as threshold size 524-a. The threshold size indicated in threshold size 524-a may be a size as large as the largest packet size allowed or at least somewhat larger than other packet sizes used for other types of messages (e.g., identifier or command messages).

According to some examples, apparatus 500 may also include a receive component 522-3. Receive component 522-3 may be executed by processor circuit 520 to receive an identification message from the terminal computing device based on the first packet size exceeding the threshold size. For example, identification message 510 may be received by receive component 522-3 based on threshold component 522-2 determining that the packet size for readiness message 505 exceeded the threshold size.

According to some examples, apparatus 500 may include an identification component 522-4. Identification component 522-4 may be executed by processor circuit 520 to determine whether the identification message includes an identifier that matches an assigned identifier for the wearable computing device including apparatus 500. For example, identification message 510 may include an identifier based on a first combination of second (short) and third (long) packet sizes. The second and third packet sizes, for example, may have respective charge times and these charge times may be assigned to bit values such as a "0" bit value for the second packet size and a "1" bit value for the third packet size. Identification component 522-4 may compare an overall bit value indicated by the first combination of second and third packet sizes to a bit value maintained by identification component with identifier 526-b (e.g., maintained in a LUT). The bit value maintained with identifier 526-b may be an assigned identifier that may uniquely identify the wearable computing device that includes apparatus 500. Identification component 522-4 may determine if a match between the identifier included in identification message 510 matches this assigned identifier. If a match exists, receive component 522-3 may then expect to receive a command message from the terminal computing device. If no match, identification component 522-4 may cause the wearable computing device that includes apparatus 500 to reset to an idle state.

According to some examples, apparatus 500 may also include a command component 522-5. Command component 522-5 may be executed by processor circuit 520 to determine a bit value for a command included in a command message received by receive component 522-3. For these examples a command message 515 may be received from the terminal device. Command message 515 may include a second combination of second and third sized packets based on detected WLAN transmissions detected by detect component 522-1. For these examples, a bit value associated with the second combination may be determined by command component 522-5 and compared to bit values maintained in commands 527-c to determine what command has been indicated by the terminal device. Commands 527-c may be maintained by command component 522-5 in a data structure such as a LUT and may include, but is not limited to, such commands as a command to provide a status update, a command to provide gathered sensor data or a command to perform a reset of the wearable computing device that includes apparatus 500.

In some examples, apparatus 500 may also include a transmit component 522-6. Transmit component 522-6 may be executed by processor circuit 520 to transmit to the terminal computing device a response message to the command message received by the receive component and interpreted by command component 522-5. For these examples, detect component 522-1 may also detect a second WLAN transmission of a second packet having the first packet size based on threshold component 522-2 determining that the second packet exceeds the threshold size indicated in threshold size 524-a. For example, transmit message 435 may include the second packet in the detected second WLAN transmission. Receive component 522-3 may then receive a second identification message 510 that includes the identifier that matches the assigned identifier maintained by identification component 522-4 in identifier 526-b. Transmit component 522-6 may transmit response message 540 as a response to command message 515 and may also use at least some of the energy harvested from the second WLAN transmission and possibly WLAN transmissions used for the second identification message 510 to transmit response message 540. In some examples, response message 540 may at least include some data (e.g., temperature data) obtained from sensors coupled to the wearable computing device that includes apparatus 500. That data may be obtained via sensor information 530.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
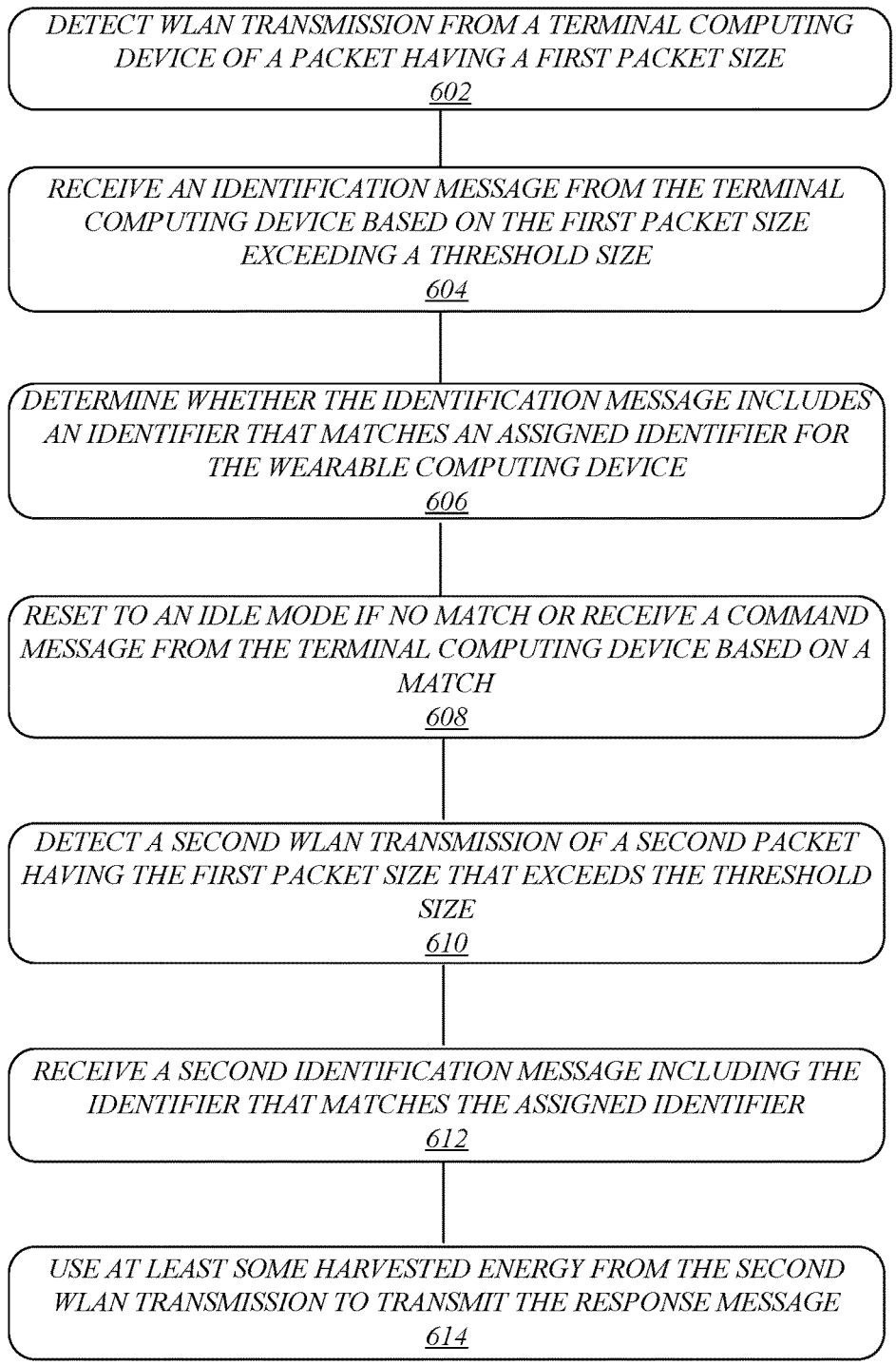
FIG. 6 illustrates an example of a first logic flow.

FIG. 6 illustrates an example of a first logic flow. As shown in FIG. 6, the first logic flow includes a logic flow 600. Logic flow 600 may be representative of some or all of the operations executed by one or more logic, features, or devices described herein, such as apparatus 500. More particularly, logic flow 600 may be implemented by detect component 522-1, threshold component 522-2, receive component 522-3, identification component 522-4, command component 522-5 or transmit component 522-6.

In the illustrated example shown in FIG. 6, in some examples, logic flow 600 at block 602 may detect a WLAN transmission from a terminal computing device of a packet having a first packet size. For these examples, detect component 522-1 may detect the WLAN transmission for the packet having the first packet size, e.g., included in readiness message 505.

According to some examples, logic flow 600 at block 604 may receive an identification message from the terminal computing device based on the first packet size exceeding a threshold size. For these examples, threshold component 522-2 may compare the first packet size to a threshold size and receive component 522-2 may then receive identification message 510.

In some examples, logic flow 600 at block 606 may determine whether the identification message includes an identifier that matches an assigned identifier for the wearable computing device. For these examples, identification component 522-4 may compare the identifier to the assigned identifier to determine whether a match exists.

According to some examples, logic flow at block 608 may reset to an idle mode if no match or receive a command message from the terminal computing device based on a match. For these examples, identification component 522-4 may cause logic and/or features of apparatus 500 to reset to an idle mode if the identifier in identification message 510 does not match the assigned identifier for the wearable computing device. If a match, receive component 522-3 may receive command message 515 that may include a command to be interpreted/determined by command component 522-5.

In some examples, logic flow at block 610 may detect a second WLAN transmission of a second packet having the first packet size that exceeds the threshold size. For these examples, detect component 522-1 may detect the second WLAN transmission and threshold component 522-2 may determine that the threshold size has been exceeded. This second WLAN transmission may be associated with a transmit message 535 to indicate to the wearable computing device to transmit a response message that may be responsive to the command included in command message 515.

According to some examples, logic flow at block 612 may receive a second identification message including the identifier that matches the assigned identifier. For these examples, receive component 522-3 may receive a second identification message 510 that includes the matching identifier as determined by identification component 522-4.

In some example, logic flow at block 614 may use at least some harvested energy from the second WLAN transmission to transmit the response message. For these examples, transmit component 522-6 may use at least some harvested energy from transmit message 535 and may also use some harvested energy from the second identification message 510 to transmit a response message 540. Response message 540, for example, may include sensor information 530 obtained from sensors coupled to the wearable computing device.

Figure 7:
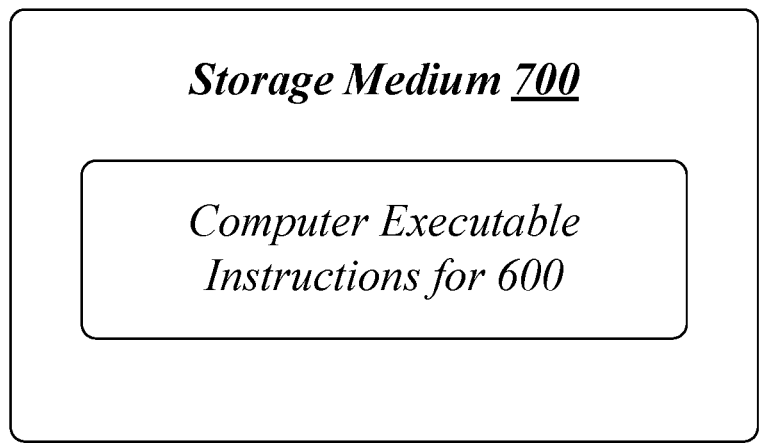
FIG. 7 illustrates an example of a first storage medium.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
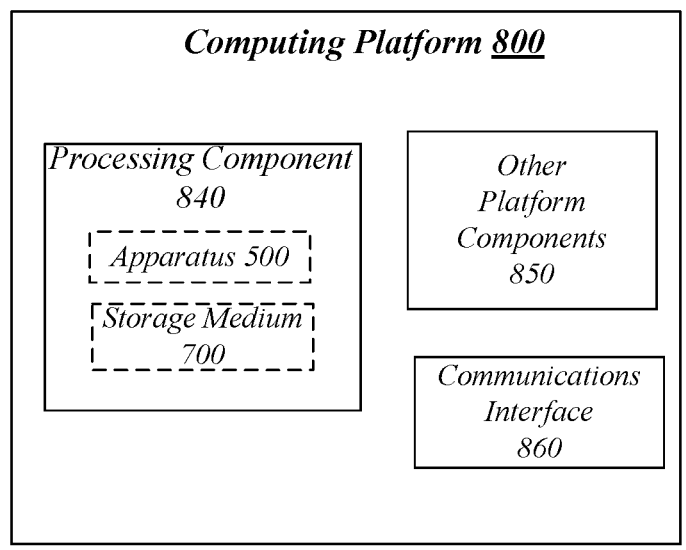
FIG. 8 illustrates an example of a computing platform.

FIG. 8 illustrates an example computing platform 800. In some examples, as shown in FIG. 8, computing platform 800 may include a processing component 840, other platform components 850 or a communications interface 860. Computing platform 800, in some examples, may be included in a wearable computing device similar to wearable computing devices described above in FIGS. 1-7.

According to some examples, processing component 840 may execute processing operations or logic for apparatus 500 and/or computer readable medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements possible located with a wearable computing device, such as memory units, chipsets, controllers, interfaces, oscillators, timing devices, energy harvesting modules, and so forth. Examples of memory units associated with other platform components 850 may include without limitation, various types of computer readable and machine readable storage media in the form of one or more memory units, such as ROM, RAM, DRAM, Double-Data-Rate DRAM (DDRAM), synchronous DRAM (SDRAM), SRAM, programmable ROM (PROM), EPROM, EEPROM, NAND flash memory, NOR flash memory, polymer memory such as ferroelectric polymer memory, ferroelectric transistor random access memory (FeTRAM or FeRAM), nanowire, ovonic memory, ferroelectric memory, 3-dimentional cross-point memory, SONOS memory, magnetic and any other type of storage media suitable for at storing information at a wearable computing device.

In some examples, communications interface 860 may include logic and/or features to support a communication interface to communicate with either a terminal device or with sensors coupled to a wearable computing device. For these examples, communications interface 860 may include one or more communication interfaces that operate according to various communication protocols or standards to communicate over wired or wireless communication links. Wired communications may occur via use of communication protocols or standards described in one or more industry standards (including progenies and variants) to include the Peripheral Component Interconnect (PCI) Express Base Specification, revision 3.0, published in November 2010 ("PCI Express" or "PCIe"), the Universal Serial Bus Specification, revision 3.0, published in November 2008 ("USB"), the I²C-bus specification, Revision 5, published October 2012, the 1-Wire Network, Design Guide, Version 1.0, published August 2004 and/or the System Management Bus (SMBus) specification, Version 2.0, published in August 2000. Wireless communications (e.g., to a terminal computing device) may occur via use of non-linear scattering effect associated with WLAN transmission to re-radiate transmissions to the source of the WLAN transmission. The WLAN transmissions may be transmitted in accordance with one or more IEEE 802.11 standards or other types of CSMA/CD standards.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 9:
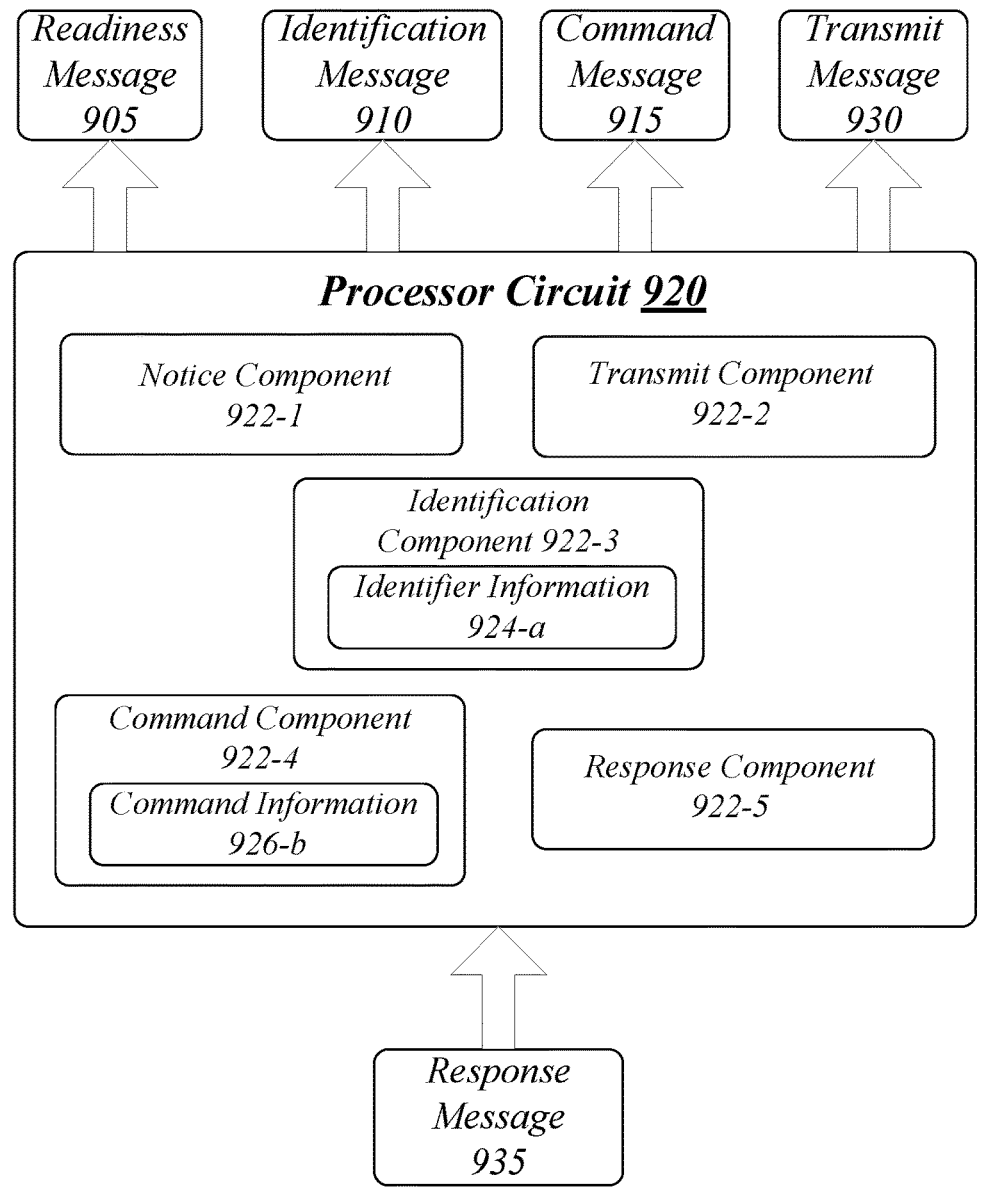
FIG. 9 illustrates an example block diagram for a second apparatus.

FIG. 9 illustrates a block diagram for a second apparatus. As shown in FIG. 9, the second apparatus includes an apparatus 900. Although apparatus 900 shown in FIG. 9 has a limited number of elements in a certain topology or configuration, it may be appreciated that apparatus 900 may include more or less elements in alternate configurations as desired for a given implementation.

The apparatus 900 may comprise a computer-implemented apparatus 900 having a processor circuit 920 arranged to execute one or more components 922-a. Similar to apparatus 500 for FIG. 5, "a" and "b" and "c" and similar designators may be variables representing any positive integer.

According to some examples, apparatus 900 may be part a terminal computing device arranged to wirelessly communicate with one or more wearable computing devices. The examples are not limited in this context.

In some examples, as shown in FIG. 9, apparatus 900 includes processor circuit 920. Processor circuit 920 may be generally arranged to execute one or more components 922-a. Processor circuit 920 can be any of various commercially available processors including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 920. According to some examples processor circuit 920 may also be an application specific integrated circuit (ASIC) and components 922-a may be implemented as hardware elements of the ASIC.

According to some examples, apparatus 900 may include a notice component 922-1. Notice component 922-1 may be executed by processor circuit 920 to generate a readiness message having a first packet size. For example, notice component 922-1 may generate readiness message 905 having a first packet size that equates to the largest packet size allowed for a WLAN transmission, e.g., according to one or more IEEE 802.11 standards or other types of CSMA/CD standards.

In some examples, apparatus 900 may also include a transmit component 922-2. Transmit component 922-2 may be executed by processor circuit 920 to cause the readiness message to be transmitted via an WLAN transmission capable of being harvested for energy by one or more wearable computing devices. For these examples, readiness message 905 may be transmitted to wearable computing devices that may be within at least 1 meter of the terminal computing device that includes apparatus 900. The 1 meter distance, in some examples, may be sufficient to enable the wearable computing devices to harvest energy from WLAN transmission sent from the terminal computing device.

In some examples, apparatus 900 may also include identification component 922-3. Identification component 922-3 may be executed by processor circuit 920 to generate an identification message including an identifier for a wearable computing device from among the one or more wearable computing devices. The identifier may be based on multiple WLAN transmissions having a first combination of second and third packet sizes. For example, identification component 922-3 may include the identifier in identification message 910. Transmit component 922-2 may then cause the transmission of identification message 910 via multiple WLAN transmission capable of being harvested for energy by at least the wearable computing device. Identification component 922-2 may have obtained the identifier from identifier information 924-a, e.g., maintained in a LUT or other data structure at the terminal computing device accessible to identification component 922-2 such as a flash memory device.

According to some examples, apparatus 900 may also include a command component 922-4. Command component 922-4 may be executed by processor circuit 920 to generate a command message including a command to the wearable computing device. The command may be based on multiple WLAN transmissions having a second combination of the second and the third packet sizes. For example, command message 915 may be generated using the second combination of the second and third packet sizes. Command information 926-b maintained in a LUT by command component 922-4 may be used to determine what specific combination to use for command message 915.

In some examples, apparatus 900 may also include a response component 922-5. Response component 922-5 may be executed by processor circuit 920 to receive a response to the command from the wearable computing device. For example, response message 935 may be received by response component 922-5. Response message 935 may have been received due to a couple of previous actions taken by other components of apparatus 900. For example, notice component 922-1 may have generated transmit message 930 having the first packet size. Transmit component 922-3 may then cause transmit message 930 to be transmitted via a WLAN transmission capable of being harvested for energy by at least the wearable computing device having the assigned identifier. Identification component 922-3 may have generated a second identification message 910 including the identifier for the wearable computing device. Transmit component 922-2 may have caused the second identification message 910 to be transmitted via multiple WLAN transmissions having the first combination of second and third packet sizes. The wearable computing device responsive to receiving transmit message 930 and the second identification message 910 may use at least some of the energy harvested from at least the WLAN transmission that transmitted transmit message 930 or the second identification message 910 to then transmit response message 935.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a second logic flow. As shown in FIG. 10, the second logic flow includes a logic flow 1000. Logic flow 1000 may be representative of some or all of the operations executed by one or more logic, features, or devices described herein, such as apparatus 1000. More particularly, logic flow 1000 may be implemented by notice component 922-1, transmit component 922-2, identification component 922-3, command component 922-4 or response component 922-5.

In the illustrated example shown in FIG. 10, in some examples, logic flow 1000 at block 1002 may transmit a packet having a first packet size via a WLAN transmission. The WLAN transmission may capable of being harvested for energy by one or more wearable computing devices. For these examples, notice component 922-1 may generate readiness message 905 and transmit component 922-2 may cause readiness message 905 to be transmitted to the one or more wearable computing devices.

In some examples, logic flow 1000 at block 1004 may transmit an identification message including an identifier for a wearable computing device from among the one or more wearable computing devices. The identification message may transmitted based on multiple WLAN transmissions having a first combination of second and third packet sizes to indicate the identifier. For these examples, identification component 922-3 may have generated identification message 910 that includes the identifier and transmit component 922-2 may cause identification message to be transmitted to the wearable computing device.

According to some examples, logic flow 1000 at block 1006 may transmit a command message including a command to the wearable computing device. The command message may be transmitted based on multiple WLAN transmissions having a second combination of the second and the third packet sizes. For these examples, command component 922-4 may have generated command message 915 that includes the command and transmit component 922-2 may cause command message 915 to be transmitted to the wearable computing device.

According to some examples, logic flow 1000 at block 1008 may transmit a second packet having the first packet size via a second WLAN transmission. For these examples, notice component 922-2 may generate transmit message 930 and transmit component 922-2 may cause transmit message 930 to be transmitted to the wearable computing device.

According to some examples, logic flow 1000 at block 1010 may transmit a second identification message that includes the identifier. The wearable computing device may be capable of harvesting energy at least some energy form the second WLAN transmission and use the harvested energy to transmit the response to the command message responsive to receiving the second packet and the second identification message. For these examples, identification component 922-3 may generate the second identification message 910 and transmit component 922-2 may cause the second identification message 910 to be transmitted to the wearable computing device.

According to some examples, logic flow 1000 at block 1012 may receive a response to the command from the wearable computing device. For these examples, response component 922-5 may receive response message 935 from the wearable computing device.

FIG. 11 illustrates an embodiment of a second storage medium. As shown in FIG. 11, the second storage medium includes a storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
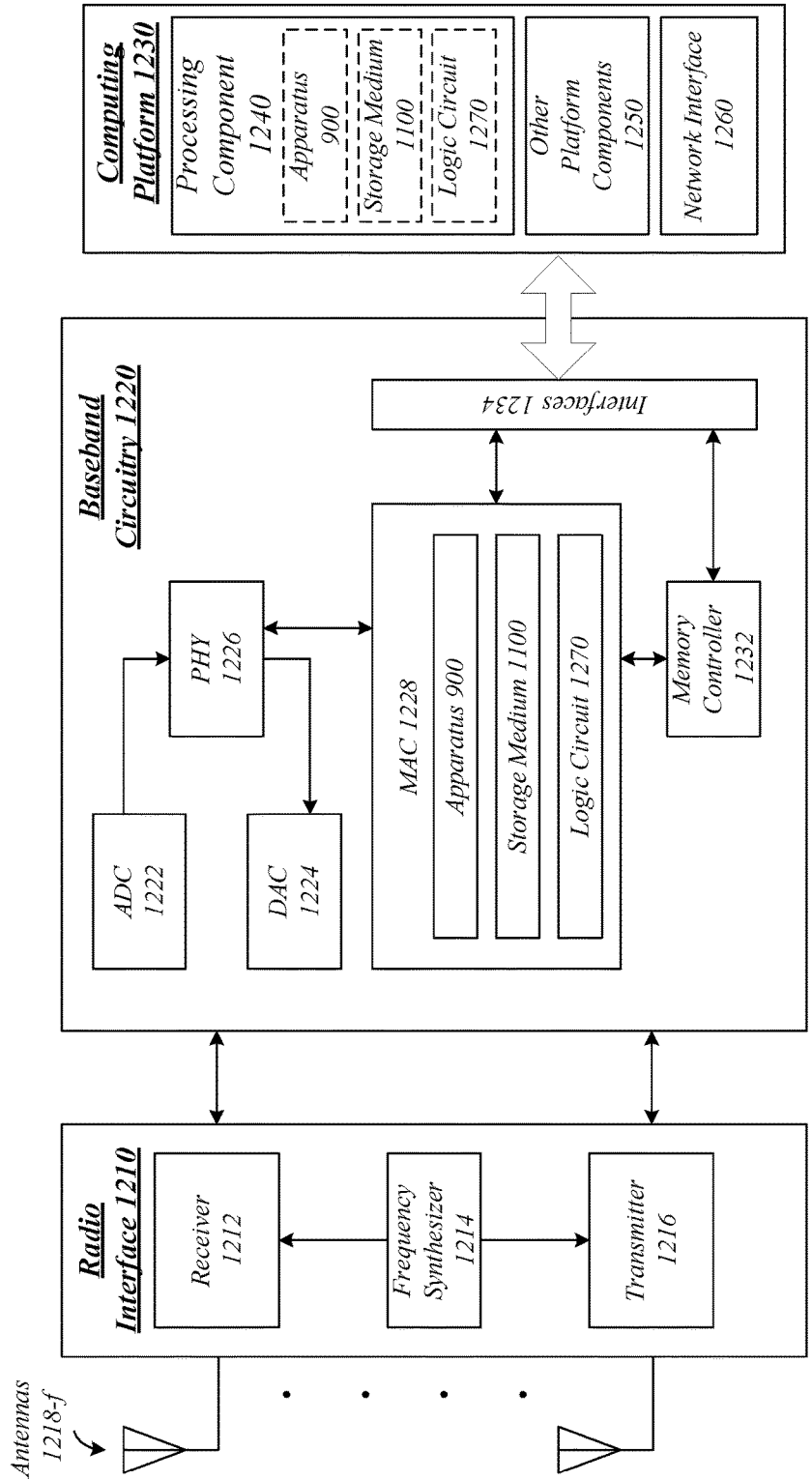
FIG. 12 illustrates an example of a device.

FIG. 12 illustrates an embodiment of a device 1200. In some examples, device 1200 may be configured or arranged for aggregating compute, memory and input/output (I/O) resources with another device. Device 1200 may implement, for example, apparatus 900, storage medium 1100 and/or a logic circuit 1270. The logic circuit 1270 may include physical circuits to perform operations described for apparatus 900. As shown in FIG. 12, device 1200 may include a radio interface 1210, baseband circuitry 1220, and computing platform 1230, although examples are not limited to this configuration.

The device 1200 may implement some or all of the structure and/or operations for apparatus 900, storage medium 1100 and/or logic circuit 1270 in a single computing entity, such as entirely within a single device. The embodiments are not limited in this context.

Radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218-f. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with MAC processing circuit 1228 and/or a computing platform 1230, for example, via one or more interfaces 1234.

In some embodiments, PHY processing circuit 1226 may include a frame construction and/or detection logic, in combination with additional circuitry such as a buffer memory, to construct and/or deconstruct communication frames (e.g., containing subframes). Alternatively or in addition, MAC processing circuit 1228 may share processing for certain of these functions or perform these processes independent of PHY processing circuit 1226. In some embodiments, MAC and PHY processing may be integrated into a single circuit.

Computing platform 1230 may provide computing functionality for device 1200. As shown, computing platform 1230 may include a processing component 1240. In addition to, or alternatively of, baseband circuitry 1220 of device 1200 may execute processing operations or logic for apparatus 400/700, storage medium 600/900, and logic circuit 1270 using the processing component 1230. Processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1230 may further include a network interface 1260. In some examples, network interface 1260 may include logic and/or features to support network interfaces operated in compliance with one or more wireless or wired technologies such as those described above for connecting to or communicating with one or more wearable computing devices or other computing devices.

Device 1200 may be, for example, user equipment, a computer, a personal computer (PC), a desktop computer, a laptop computer, a notebook computer, a netbook computer, a tablet computer, an ultra-book computer, a smart phone, a wearable computing device or a gaming console. Accordingly, functions and/or specific configurations of device 1200 described herein, may be included or omitted in various examples of device 1200, as suitably desired.

Examples of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using multiple input multiple output (MIMO) communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

In some examples, an example first apparatus may include a processor circuit for a wearable computing device. The example first apparatus may also include a detect component for execution by the processor circuit to detect a wireless local area network (WLAN) transmission from a terminal computing device of a packet having a first packet size. The example first apparatus may also include a threshold component for execution by the processor circuit to determine whether the first packet size exceeds a threshold size. The example first apparatus may also include a receive component for execution by the processor circuit to receive an identification message from the terminal computing device based on the first packet size exceeding the threshold size. The example first apparatus may also include an identification component for execution by the processor circuit to determine whether the identification message includes an identifier that matches an assigned identifier for the wearable computing device. The receive component may then receive a command message from the terminal computing device based on a match.

According to some examples for the example first apparatus, the detect component may be capable of detecting the WLAN transmission from the terminal computing device based on whether a harvesting module resident on the wearable computing device is capable of harvesting energy from the WLAN transmission throughout the transmission of the packet having the first packet size.

In some examples for the example first apparatus, the detect component may detect a second WLAN transmission of a second packet having the first packet size. The threshold component may then determine that the second packet exceeds the threshold size. The receive component may then receive a second identification message including the identifier that matches the assigned identifier as determined by the identification component. The example first apparatus may also include a transmit component for execution by the processor circuit to use at least some energy harvested from the second WLAN transmission to transmit a response to the command message, the energy harvested by the harvesting module.

According to some examples for the example first apparatus, the identifier included in the identification message may be indicated based on multiple WLAN transmissions detected by the detect component that have a first combination of second and third packet size. For these examples, the second packet size may represent a "0" bit value and the third packet size may represent a "1" bit value.

In some examples, the example first apparatus may also include a command component for execution by the processor circuit to determine if a bit value for the command included in the command message. For these examples, the bit value may be determined based on multiple detected WLAN transmissions having a second combination of the second and third packet sizes.

According to some examples for the example first apparatus, the second and third packet sizes may be both below the threshold size.

In some examples for the example first apparatus, the first, the second and the third packet sizes may be determined by the detect component based on separately measured charge durations associated with the harvesting module harvesting energy from each WLAN transmission used to transmit the first and second packets and the first or the second combination of the second and third packet sizes.

According some examples for the example first apparatus, the response message to include at least one of a status indication for the wearable computing device, an indication of completion of a command, or data associated with a sensor coupled with the wearable computing device.

In some examples for the example first apparatus, the sensor coupled with the wearable computing device may include a temperature sensor, a blood pressure sensor, an oxygen sensor, a heart rate sensor, a moisture sensor, a motion sensor, an accelerometer sensor, a position sensor or a location sensor.

According to some examples for the example first apparatus, each WLAN transmission may be arranged in compliance with one or more wireless communication standards or specifications associated with Institute of Electrical and Electronic Engineers (IEEE) 802.11 standards.

In some examples for the example first apparatus, the first packet size may be the largest packet size allowed by the one or more IEEE 802.11 standards in a given WLAN transmission.

In some examples, example first methods implemented at a wearable computing device may include detecting a wireless local area network (WLAN) transmission from a terminal computing device of a packet having a first packet size. An identification message from the terminal computing device may then be received based on the first packet size exceeding a threshold size. A determination as to whether the identification message includes an identifier that matches an assigned identifier for the wearable computing device may be made and resetting to an idle mode if no match or receiving a command message from the terminal computing device based on a match.

According to some examples, the example first methods may also include detecting a second WLAN transmission of a second packet having the first packet size that exceeds the threshold size. A second identification message may then be received that includes the identifier that matches the assigned identifier. For these examples, at least some harvested energy from the second WLAN transmission may be used to transmit a response message to the received command message.

In some examples for the example first methods, the identifier included in the identification message may be indicated based on multiple detected WLAN transmissions having a first combination of second and third packet sizes, the second packet size representing a "0" bit value and the third packet size representing a "1" bit value.

According to some examples for the example first methods, the command included in the command message may be indicated based on multiple detected WLAN transmissions having a second combination of the second and third packet sizes.

In some examples for the example first methods, the second and third packet sizes may both be below the threshold size.

According to some examples for the example first methods, the first, the second and the third packet sizes may be determined based on separately measured charge durations associated with harvesting energy from each detected WLAN transmission used to transmit the first and second packets and the first or the second combination of the second and third packet sizes.

In some examples for the example first methods, resetting to an idle mode may include resetting a charge duration timer and ignoring or not receiving one or more subsequent, detected WLAN transmissions for packets having a packet size below the threshold size.

According to some examples for the example first methods, the response message may include at least one of a status indication for the wearable computing device, an indication of completion of a command, or data associated with a sensor coupled with the wearable computing device.

In some examples for the example first methods, the sensor coupled with the wearable computing device may include a temperature sensor, a blood pressure sensor, an oxygen sensor, a heart rate sensor, a moisture sensor, a motion sensor, an accelerometer sensor, a position sensor or a location sensor.

According to some examples for the example first methods, detecting the WLAN transmission may be based on whether the wearable computing device is capable of distinguishing between presence or absence of energy from the WLAN transmission or based on whether the wearable computing device is capable of harvesting energy from the WLAN transmission throughout the transmission of the packet having the first packet size.

In some examples for the example first methods, each WLAN transmission may be arranged in compliance with one or more wireless communication standards or specifications associated with Institute of Electrical and Electronic Engineers (IEEE) 802.11 standards.

According to some examples for the example first methods, the first packet size may include the largest packet size allowed by the one or more IEEE 802.11 standards in a given WLAN transmission.

In some examples, an example first at least one machine readable medium comprising a plurality of instructions that in response to being executed on a system at a wearable computing device cause the system to detect a wireless local area network (WLAN) transmission from a terminal computing device of a packet having a first packet size. The instructions may also cause the system to receive an identification message from the terminal computing device based on the first packet size exceeding a threshold size. The instructions may also cause the system to determine whether the identification message includes an identifier that matches an assigned identifier for the wearable computing device. The instructions may also cause the system to receive a command message from the terminal computing device based on a match.

According to some examples for the first at least one machine readable medium, the instructions may also cause the system to detect a second WLAN transmission of a second packet having the first packet size that exceeds the threshold size. The instructions may also cause the system to receive a second identification message including the identifier that matches the assigned identifier. The instructions may also cause the system to use harvested energy from the second WLAN transmission to transmit a response message to the received command message.

In some examples for the first at least one machine readable medium, the first packet size may be determined based on a measured charge duration associated with harvesting energy from the WLAN transmission used to transmit the first packet.

According to some examples for the first at least one machine readable medium, the identifier included in the identification message may be indicated based on multiple detected WLAN transmissions having a first combination of second and third packet sizes. The command included in the command message may be indicated based on multiple detected WLAN transmissions having a second combination of the second and third packet sizes, the second packet size to represent a "0" bit value and the third packet size to represent a "1" bit value.

In some examples for the first at least one machine readable medium, the second and third packet sizes may both be below the threshold size.

According to some examples for the first at least one machine readable medium, the response message may include at least one of a status indication for the wearable computing device, an indication of completion of a command or data associated with a sensor coupled with the wearable computing device.

In some examples for the first at least one machine readable medium, the sensor coupled with the wearable computing device may include a temperature sensor, a blood pressure sensor, an oxygen sensor, a heart rate sensor, a moisture sensor, a motion sensor, an accelerometer sensor, a position sensor or a location sensor.

According to some examples for the first at least one machine readable medium, the instructions may cause the system to detect the WLAN transmission based on whether the wearable computing device is capable of distinguishing between presence or absence of energy from the WLAN transmission or based on whether the wearable computing device is capable of harvesting energy from the WLAN transmission throughout the transmission of the packet having the first packet size.

In some examples for the first at least one machine readable medium, each WLAN transmission may be arranged in compliance with one or more wireless communication standards or specifications associated with Institute of Electrical and Electronic Engineers (IEEE) 802.11 standards.

According to some examples for the first at least one machine readable medium, the first packet size may include the largest packet size allowed by the one or more IEEE 802.11 standards in a given WLAN transmission.

In some examples, an example second apparatus may include a processor circuit for a terminal computing device. The example second apparatus may also include a notice component for execution by the processor circuit to generate a readiness message having a first packet size. The example second apparatus may also include a transmit component for execution by the processor circuit to cause the readiness message to be transmitted via a wireless local area network (WLAN) transmission capable of being harvested for energy by one or more wearable computing devices. The example second apparatus may also include an identification component for execution by the processor circuit to generate an identification message including an identifier for a wearable computing device from among the one or more wearable computing devices. The identifier may be based on multiple WLAN transmissions having a first combination of second and third packet sizes. The transmit component may cause the identification message to be transmitted via multiple WLAN transmissions capable of being harvested for energy by at least the wearable computing device. The example second apparatus may also include a command component for execution by the processor circuit to generate a command message including a command to the wearable computing device, the command based on multiple WLAN transmissions having a second combination of the second and the third packet sizes. The transmit component may cause the command message to be transmitted via multiple WLAN transmissions capable of being harvested for energy by at least the wearable computing device. The example second apparatus may also include a response component for execution by the processor circuit to receive a response to the command from the wearable computing device.

According to some examples for the example second apparatus, the notice component may generate a transmit message having the first packet size. The transmit component may cause the transmit message to be transmitted via a WLAN transmission capable of being harvested for energy by at least the wearable computing device. The identification component may generate a second identification message including the identifier for the wearable computing device. The transmit component may cause the second identification message including the identifier to be transmitted via multiple WLAN transmissions having the first combination of second and third packet sizes. The wearable computing device, responsive to receiving the transmit message and the second identification message, to use at least some of the energy harvested from at least the WLAN transmission that transmitted the second packet to transmit the response to the command.

In some examples for the example second apparatus, the command included in the command message may include a status update request, a sensor data request or a reset command.

According to some examples for the example second apparatus, the response to the command message may include at least one of a status indication for the wearable computing device, an indication of completion of a command included in the command message, or data associated with a sensor coupled with the wearable computing device.

In some examples for the example second apparatus, the second packet size may represent a "0" bit value and the third packet size may represent a "1" bit value.

According to some examples for the example second apparatus, each WLAN transmission may be arranged in compliance with one or more wireless communication standards or specifications associated with Institute of Electrical and Electronic Engineers (IEEE) 802.11 standards.

In some examples for the example second apparatus, the first packet size may include the largest packet size allowed by the one or more IEEE 802.11 standards in a given WLAN transmission.

In some examples, example second methods implemented at a terminal computing device may include transmitting a packet having a first packet size via a wireless local area network (WLAN) transmission. The WLAN transmission may be capable of being harvested for energy by one or more wearable computing devices. The example second methods may also include transmitting an identification message including an identifier for a wearable computing device from among the one or more wearable computing devices. The identification message transmitted based on multiple WLAN transmissions having a first combination of second and third packet sizes to indicate the identifier. The example second methods may also include transmitting a command message including a command to the wearable computing device. The command message may be transmitted based on multiple WLAN transmissions having a second combination of the second and the third packet sizes. The example second methods may also include receiving a response to the command from the wearable computing device.

According to some examples for the example second methods, prior to receiving the response, the example second methods may also include transmitting a second packet having the first packet size via a second WLAN transmission. A second identification message that includes the identifier may then be transmitted. The wearable computing device may be capable of harvesting energy from the second WLAN transmission and use at least some of the harvested energy to transmit the response to the command message responsive to receiving the second packet and the second identification message.

In some examples for the example second methods, the command included in the command message may include a status update request, a sensor data request or a reset command.

According to some examples for the example second methods, the response to the command message may include at least one of a status indication for the wearable computing device, an indication of completion of a command included in the command message, or data associated with a sensor coupled with the wearable computing device.

In some examples for the example second methods, the second packet size may represent a "0" bit value and the third packet size may represent a "1" bit value.

According to some examples for the example second methods, each WLAN transmission may be arranged in compliance with one or more wireless communication standards or specifications associated with Institute of Electrical and Electronic Engineers (IEEE) 802.11 standards.

In some examples for the example second methods, the first packet size may include the largest packet size allowed by the one or more IEEE 802.11 standards in a given WLAN transmission.

According to some examples for the example second methods, the terminal computing device may be located within one meter of the one or more wearable computing devices for the one or more wearable computing devices to be capable of harvesting energy from the WLAN transmission.

In some examples, an example second at least one machine readable medium comprising a plurality of instructions that in response to being executed on a system at a terminal computing device cause the system to transmit a packet having a first packet size via a wireless local area network (WLAN) transmission. The WLAN transmission may be capable of being harvested for energy by one or more wearable computing devices. The instructions may also cause the system to transmit an identification message including an identifier for a wearable computing device from among the one or more wearable computing devices. The identification message may be transmitted based on multiple WLAN transmissions having a first combination of second and third packet sizes to indicate the identifier. The instructions may also cause the system to transmit a command message including a command to the wearable computing device. The command message may be transmitted based on multiple WLAN transmissions having a second combination of the second and the third packet sizes. The instructions may also cause the system to receive a response to the command from the wearable computing device.

According to some examples for the second at least one machine readable medium, the instructions may also cause the system to transmit a second packet having the first packet size via a second WLAN transmission. The instructions may also cause the system to transmit a second identification message that includes the identifier. The wearable computing device capable of harvesting energy from the second WLAN transmission and use at least some of the harvested energy to transmit the response to the command message responsive to receiving the second packet and the second identification message.

In some examples for the second at least one machine readable medium, the command included in the command message may include a status update request, a sensor data request or a reset command.

According to some examples for the second at least one machine readable medium, the response to the command message may include at least one of a status indication for the wearable computing device, an indication of completion of a command included in the command message, or data associated with a sensor coupled with the wearable computing device.

In some examples for the second at least one machine readable medium, the second packet size may represent a "0" bit value and the third packet size may represent a "1" bit value.

According to some examples for the second at least one machine readable medium, each WLAN transmission may be arranged in compliance with one or more wireless communication standards or specifications associated with Institute of Electrical and Electronic Engineers (IEEE) 802.11 standards.

According to some examples for the second at least one machine readable medium, the first packet size may include the largest packet size allowed by the one or more IEEE 802.11 standards in a given WLAN transmission.

In some examples for the second at least one machine readable medium, the terminal computing device may be located within one meter of the one or more wearable computing devices for the one or more wearable computing devices to be capable of harvesting energy from the WLAN transmission.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor; and
   memory storing instructions for execution by the processor, the instructions, when executed, cause the processor to:
   receive a packet having a first size, the packet to indicate a command is forthcoming based on the first size being greater than a threshold,
   receive a plurality of packets, the plurality of packets to include an identification and the command, the identification based on a first combination of one or more packets of the plurality of packets having one of a second size and a third size, and the command based on a second combination of one or more packets of the plurality of packets having one of the second size and the third size,
   determine whether the identification matches an assigned identification for a wearable computing device,
   set the wearable computing device into an idle state if the identification and the assigned identification do not match, and
   cause a response to transmit based on the command if the identification and the assigned identification match.

2. The apparatus of claim 1, comprising circuitry to harvest energy from one or more transmissions received via communication of at least one of the packet and the plurality of packets.

3. The apparatus of claim 1, the processor to cause the response to transmit utilizing energy harvested from one or more transmissions received via communication of at least one of the packet and plurality of packets.

4. The apparatus of claim 1, the processor to determine the first size of the packet is greater than the threshold based on a charge time associated with harvesting energy.

5. The apparatus of claim 1, the second size represents a "0" bit value and the third size represents a "1" bit value the plurality of packets, and the processor to determine the identification indicated by the first combination of one or more packets representing bit values based on sizes of the one or more packets.

6. The apparatus of claim 1, the second size represents a "0" bit value and the third size represents a "1" bit value the plurality of packets, and the processor to determine the command indicated by the second combination of one or more packets representing bit values based on sizes of the one or more packets.

7. The apparatus of claim 1, the processor to determine sizes for the plurality of packets based on charge times, the second size having a shorter charge time than a charge time for the third size, and the second size and third size both each having shorter charge times than another charge time the first size.

8. The apparatus of claim 1, the idle state comprising one or more resetting charge duration timers and ignoring the plurality of packets.

9. An apparatus, comprising:
a processor; and
memory storing instructions for execution by the processor, the instructions, when executed, cause the processor to:
send a packet having a first size to one or more wearable computing devices, the packet to indicate a command is forthcoming based on the first size,
send a plurality of packets, the plurality of packets to include an identification and the command, the identification based on a first combination of one or more packets of the plurality of packets, each of the one or more packets, and the command based on a second combination of other one or more packets of the plurality of packets, each of the plurality of packets having one of a second size and a third size, and
receive a response from a wearable compute device of the one or more wearable devices based on the command and the identification matching an assigned identification for the wearable compute device.

10. The apparatus of claim 9, comprising the processor to send the packet and the plurality of packets as one or more transmissions to cause energy harvesting by the one or more wearable computing devices.

11. The apparatus of claim 9, the processor to receive the response in a transmission communicated via energy harvested from one or more transmissions used to send at least one of the packet and the plurality of packets.

12. The apparatus of claim 9, the processor to send the packet having the first size greater than a threshold based on a charge time to indicate the command is forthcoming.

13. The apparatus of claim 9, the second size represents a "0" bit value and the third size represents a "1" bit value for each of the plurality of packets, and the processor to send the identification indicated by the first combination representing bit values based on sizes of the one or more packets.

14. The apparatus of claim 9, the second size represents a "0" bit value and the third size represents a "1" bit value for each of the plurality of packets, and the processor to send the command indicated by the second combination representing bit values based on sizes of the one or more packets.

15. The apparatus of claim 9, wherein the second size having a shorter charge time than a charge time for the third size, and the second size and third size each having shorter charge times than another charge time for the first size.

16. A non-transitory computer-readable storage medium containing instructions that, when executed, cause a system to:
receive a packet having a first size, the packet to indicate a command is forthcoming based on the first size being greater than a threshold;
receive a plurality of packets, the plurality of packets to include an identification and the command, the identification based on a first combination of one or more packets of the plurality of packets having one of a second size and a third size, and the command based on a second combination of one or more packets of the plurality of packets having one of the second size and the third size;
determine whether the identification matches an assigned identification for a wearable computing device;
set the wearable computing device into an idle state if the identification and the assigned identification do not match; and
cause a response to transmit based on the command if the identification and the assigned identification match.

17. The non-transitory computer-readable storage medium of claim 16, further comprising instructions that, when executed, enable a system including circuitry to harvest energy from one or more transmissions received via communication of at least one of the packet and the plurality of packets.

18. The non-transitory computer-readable storage medium of claim 16, further comprising instructions that, when executed, enable a system to cause the response to transmit utilizing energy harvested from one or more transmissions received via communication of at least of the packet and plurality of packet.

19. The non-transitory computer-readable storage medium of claim 16, further comprising instructions that, when executed, enable a system to determine the first size of the packet is greater than the threshold based on a charge time associated with harvesting energy.

20. The non-transitory computer-readable storage medium of claim 16, the second size represents a "0" bit value and the third size represents a "1" bit value the plurality of packets, and the system comprising a processor to determine the identification indicated by the first combination of one or more packets representing bit values based on sizes of the one or more packets.

21. The non-transitory computer-readable storage medium of claim 16, the second size represents a "0" bit value and the third size represents a "1" bit value the plurality of packets, and the system comprising a processor to determine the command indicated by the second combination of one or more packets representing bit values based on sizes of the one or more packets.

22. The non-transitory computer-readable storage medium of claim 16, further comprising instructions that, when executed, enable a system to determine sizes for the plurality of packets based on charge times, wherein the second size having a shorter charge time than a charge time for the third size, and the second size and third size both each having shorter charge times than another charge time the first size.

23. The non-transitory computer-readable storage medium of claim 16, the idle state comprising one or more resetting charge duration timers and ignoring the plurality of packets.

24. A non-transitory computer-readable storage medium containing instructions that, when executed, cause a system to:
send a packet having a first size to one or more wearable computing devices, the packet to indicate a command is forthcoming based on the first size;
send a plurality of packets, the plurality of packets to include an identification and the command, the identification based on a first combination of one or more packets of the plurality of packets, each of the one or more packets, and the command based on a second combination of other one or more packets of the plurality of packets, each of the plurality of packets having one of a second size and a third size; and
receive a response from a wearable compute device of the one or more wearable devices based on the command and the identification matching an assigned identification for the wearable compute device.

25. The non-transitory computer-readable storage medium of claim 24, further comprising instructions that, when executed, enable a system to send the packet and the plurality of packets as one or more transmissions to cause energy harvesting by the one or more wearable computing devices.

26. The non-transitory computer-readable storage medium of claim 24, further comprising instructions that, when executed, enable a system to receive the response in a transmission communicated via energy harvested from one or more transmissions used to send at least one of the packet and the plurality of packets.

27. The non-transitory computer-readable storage medium of claim 24, further comprising instructions that, when executed, enable a system to send the packet having the first size greater than a threshold based on a charge time to indicate the command is forthcoming.

28. The non-transitory computer-readable storage medium of claim 24, the second size represents a "0" bit value and the third size represents a "1" bit value for each of the plurality of packets, and the system comprising a processor to send the identification indicated by the first combination representing bit values based on sizes of the one or more packets.

29. The non-transitory computer-readable storage medium of claim 24, the second size represents a "0" bit value and the third size represents a "1" bit value for each of the plurality of packets, and the system comprising a processor to send the command indicated by the second combination representing bit values based on sizes of the one or more packets.

30. The non-transitory computer-readable storage medium of claim 24, wherein the second size having a shorter charge time than a charge time for the third size, and the second size and third size each having shorter charge times than another charge time for the first size.

* * * * *